US006872776B1

(12) United States Patent
Iguchi et al.

(10) Patent No.: US 6,872,776 B1
(45) Date of Patent: Mar. 29, 2005

(54) VINYL CHLORIDE RESIN COMPOSITION AND MOLDED OBJECT COMPRISING THE SAME

(75) Inventors: Hirokazu Iguchi, Kakogawa (JP); Kazunori Saegusa, Kobe (JP); Satoshi Mizunuma, Akashi (JP); Akira Takaki, Kobe (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 09/700,171

(22) PCT Filed: May 31, 1999

(86) PCT No.: PCT/JP99/02899

§ 371 (c)(1),
(2), (4) Date: Nov. 13, 2000

(87) PCT Pub. No.: WO00/60003

PCT Pub. Date: Oct. 12, 2000

(30) Foreign Application Priority Data

Mar. 31, 1999 (JP) ............................................ 11-093609

(51) Int. Cl.⁷ .............................................. C08L 31/02
(52) U.S. Cl. .............................. 525/80; 525/70; 525/78; 525/79; 524/425; 524/567
(58) Field of Search ......................... 524/425; 528/488; 525/326.1

(56) References Cited

U.S. PATENT DOCUMENTS

| | | | | |
|---|---|---|---|---|
| 3,678,133 A | | 7/1972 | Ryan ...................... 260/876 R |
| 3,996,173 A | * | 12/1976 | Heichele ................... 260/23 X |
| 4,128,605 A | * | 12/1978 | Kishida et al. ......... 260/876 R |
| 4,220,734 A | * | 9/1980 | Kosugi et al. ................. 525/85 |
| 4,436,861 A | * | 3/1984 | Ushioda et al. ............. 524/425 |
| 4,507,414 A | * | 3/1985 | McRowe et al. ........... 524/100 |
| 4,670,509 A | * | 6/1987 | Aoyama et al. .............. 525/85 |
| 5,124,373 A | * | 6/1992 | Baumgaertel et al. ...... 523/210 |
| 5,132,359 A | * | 7/1992 | Sasaki et al. .................. 525/63 |
| 5,362,790 A | * | 11/1994 | Gloesener .................... 524/425 |
| 5,424,363 A | * | 6/1995 | Nagata et al. ................ 525/85 |
| 5,693,699 A | * | 12/1997 | Bertelo et al. .............. 524/400 |
| 6,204,327 B1 | * | 3/2001 | Takaki et al. ................. 525/71 |

FOREIGN PATENT DOCUMENTS

| | | | | |
|---|---|---|---|---|
| EP | 143 194 A1 | * | 6/1985 | ........... C08L/27/06 |
| FR | 2551446 | * | 8/1983 | ......... C08F/265/06 |
| FR | 2551447 | * | 8/1983 | ......... C08F/265/06 |
| JP | 48-15457 | | 5/1973 | |
| JP | 49-10237 | | 1/1974 | |
| JP | 50-105748 | | 8/1975 | |
| JP | 51-12849 | | 1/1976 | |
| JP | 56-163139 | | 12/1981 | |
| JP | 4-33907 | | 2/1992 | |
| JP | 5-132600 | | 5/1993 | |
| JP | 7-3168 | | 1/1995 | |

* cited by examiner

*Primary Examiner*—David W. Wu
*Assistant Examiner*—Rip A. Lee
(74) *Attorney, Agent, or Firm*—Westerman, Hattori, Daniels & Adrian, LLP

(57) ABSTRACT

A vinyl chloride resin composition having excellent weatherability and impact resistance which comprises (a) a vinyl chloride resin, (b) a graft copolymer which is obtained by graft-polymerizing (b2) a graft monomer component composed of 40 to 100% by weight of methyl methacrylate and 0 to 60% by weight of at least one monomer selected from the group consisting of an alkyl acrylate, an alkyl methacrylate, an unsaturated nitrile and an aromatic vinyl compound onto (b1) a crosslinked elastomeric polymer composed mainly of an alkyl acrylate, the methyl ethyl ketone-soluble portion of the graft copolymer having an $\eta sp/c$ of 1 to 5 measured at 30° C. with respect to its 0.2 g/100 cc acetone solution, and (c) calcium carbonate; and molded articles having a multilayer structure wherein a layer molded from the above composition is used as the surface layer or the inner layer.

7 Claims, No Drawings

VINYL CHLORIDE RESIN COMPOSITION AND MOLDED OBJECT COMPRISING THE SAME

TECHNICAL FIELD

The present invention relates to a vinyl chloride resin composition, and more particularly to a vinyl chloride resin composition containing calcium carbonate as an additive, which is excellent in weatherability and impact resistance.

BACKGROUND ART

Molded articles made of vinyl chloride resins have good mechanical and chemical properties and have been widely used in various fields, but have the defect that the impact resistance is not sufficient. In order to improve the impact resistance, many proposals have been made. In particular, MBS resins wherein methyl methacrylate and styrene or acrylonitrile are graft-copolymerized onto a butadiene-based polymer rubber have been popularly used at present.

However, although the impact resistance is improved if an MBS resin is incorporated into a vinyl chloride resin, there is a defect that if molded articles prepared therefrom are used outdoors, the impact resistance is remarkably deteriorated since the MBS resin is poor in weatherability. Thus, the use of MBS resin for outdoor uses is restricted at present.

The main cause of the deterioration in weatherability of MBS resins has been considered to be due to ultraviolet deterioration of diene units included in the MBS resins. Thus, in order to improve the weatherability of MBS resins as well as impartment of impact resistance, there is proposed a method wherein methyl methacrylate, an aromatic vinyl compound and an unsaturated nitrile are graft-polymerized onto a crosslinked alkyl acrylate elastomeric polymer made from an alkyl acrylate containing no double bond and a crosslinking agent (Japanese Patent Publication Kokoku No. 51-28117).

When the graft copolymer prepared by the above method is used, vinyl chloride resin molded articles prepared have excellent weatherability and can be used in the field of buildings which require long term weathering resistance, particularly in window frame and siding material. Further, with the progress of processing technique, it has been popularly conducted to prevent discoloration by forming the molded articles in two-layer structure and using a molding having a particularly excellent weatherability in the surface layer exposed to sunlight.

In such two-layered molded articles, the surface layer is called "cap stock", and the inner layer is called "substrate". Such composite articles can be prepared by various different methods and, for instance, known are methods of the preparation by lamination by means of heat melting or an adhesive or by coextrusion. The ratio of the thickness of the cap stock layer to that of the substrate layer is from about 25/75 to about 10/90, and the substrate occupies the most part.

Vinyl chloride resin moldings have been generally used in the substrate, although moldings other than vinyl chloride resins may be used in the cap stock as a material having a remarkably improved weather discoloration resistance. Also, for example, in case of a siding material, the above-mentioned acrylic rubber-based graft copolymer has been incorporated in the vinyl chloride resin molding used as the substrate of the siding material in order to improve the weatherability and impact resistance.

Besides, calcium carbonate is frequently used as a filler, since the incorporation of calcium carbonate is effective for improving the Izod impact resistance and flexural modulus. However, it is the present state that the amount of calcium carbonate is restricted to about 5–8 parts by weight per 100 parts by weight of a vinyl chloride resin, since the Gardner impact strength used in practicability evaluation of siding sheet is greatly lowered.

The present invention has been made in view of the prior art as mentioned above. It is an object of the present invention to provide a vinyl chloride resin composition which is improved in weatherability and impact resistance while increasing the amount of calcium carbonate.

DISCLOSURE OF INVENTION

According to a conventional technique, improvement in impact resistance of vinyl chloride resin compositions has been generally practiced by increasing the proportion of a crosslinked rubber polymer in a graft copolymer. Also, since for improving the impact resistance of vinyl chloride resin compositions it is not required to set the molecular weight of graft chain of the graft copolymer to a specific range, graft copolymers having graft chains with low or medium molecular weight which are easily obtained by a general polymerization procedure have been usually employed. However, in case of vinyl chloride resin compositions incorporated with calcium carbonate in an amount increased to 10 to 30 parts by weight, graft copolymers prepared according to a conventional technique cannot exhibit a sufficient effect of improving the impact resistance.

The impact resistance of vinyl chloride resin molded articles depends on degree of ease to cause shear yield of a vinyl chloride resin. The degree of ease to cause shear yield is known to be affected by stress-strain condition in impact test, testing rate, testing temperature and the like. In case that the shear yield is hard to occur as in a notched Izod impact test, calcium carbonate serves as a stress concentration point, thus having an effect of improving the shear impact strength. On the other hand, in case that the shear yield is easy to occur as in a Gardner impact test, it is assumed that since calcium carbonate rather serves as a defective point and break progresses in the vicinity of calcium carbonate, the impact resistance is lowered.

The graft copolymer used in the present invention is such that the molecular weight of the graft chains is high and the amount of the graft chains is large and, therefore, it is assumed that the graft copolymer promotes entanglement between the graft chains and the vinyl chloride resin chains or between the graft chains, thus exhibiting an effect of preventing the progress of breakage generating from calcium carbonate. In these respects, the present invention is essentially different from prior art.

The present inventors have found that a graft copolymer wherein the proportion of a crosslinked rubber polymer in the graft copolymer is as relatively low as 25 to 75 parts by weight and the ηsp/c of a component, which is extracted from the graft copolymer with methyl ethyl ketone, as measured at 30° C. with respect to a 0.2 g/100 cc acetone solution is from 1 to 5 which is higher than prior art, sufficiently improves the impact resistance of vinyl chloride resin compositions incorporated with 10 to 30 parts by weight of calcium carbonate.

Thus, the present invention provides a vinyl chloride resin composition having excellent weatherability and impact resistance which comprises:

(a) 100 parts by weight of a vinyl chloride resin, (b) 1 to 10 parts by weight of a graft copolymer which is obtained by polymerizing 25 to 75 parts by weight of a graft monomer component to 25 to 75 parts by weight of a crosslinked elastomeric polymer so that the total thereof is 100 parts by weight, and the methyl ethyl ketone-soluble portion of which has an ηsp/c of 1 to 5 measured at 30° C. with respect to its 0.2 g/100 cc acetone solution, said graft monomer component being composed of 40 to 100% by weight of methyl methacrylate and 0 to 60% by weight of at least one monomer selected from the group consisting of an alkyl acrylate having a $C_1$ to $C_8$ alkyl group, an alkyl methacrylate having a $C_2$ to $C_6$ alkyl group, an unsaturated nitrile and an aromatic vinyl compound, and said crosslinked elastomeric polymer being composed of 79.9 to 99.99% by weight of an alkyl acrylate having a $C_2$ to $C_8$ alkyl group, 0.01 to 5% by weight of a polyfunctional monomer and 0 to 20% by weight of other monomers copolymerizable therewith, and (c) 10 to 30 parts by weight of calcium carbonate.

The present invention also provides a molded article having a layer molded from the above composition.

BEST MODE FOR CARRYING OUT THE INVENTION

The crosslinked elastomeric polymer used in the present invention is prepared by using 79.9 to 99.99% by weight, preferably 85 to 99.9% by weight, of an alkyl acrylate having a $C_2$ to C8 alkyl group, 0.01 to 5% by weight, preferably 0.1 to 3% by weight, of a polyfunctional monomer and 0 to 20% by weight, preferably 0 to 15% by weight, of other monomers copolymerizable therewith. If the proportion of the alkyl acrylate having a $C_2$ to $C_8$ alkyl group is less than 79.9% by weight, a problem arises in impact resistance or weather discoloration resistance, and if the proportion is more than 99.99% by weight, the amount of the polyfunctional monomer becomes too small, so the effect produced thereby is not sufficiently obtained. Also, if the proportion of the polyfunctional monomer is more than 5% by weight, the impact resistance is lowered. Further, if the proportion of the monomer copolymerizable with the alkyl acrylate and the polyfunctional monomer is more than 20% by weight, the impact resistance is lowered.

The alkyl acrylate having a $C_2$ to $C_8$ alkyl group is a component used for forming a rubber component having an excellent weatherability and an improved impact resistance. Representative examples thereof are, for instance, ethyl acrylate, propyl acrylate, isobutyl acrylate, n-butyl acrylate, 2-ethylhexyl acrylate and the like. The alkyl acrylates may be used alone or in combination of two or more. Of these, n-butyl acrylate and 2-ethylhexyl acrylate are preferred from the viewpoint that the Tg of the rubber component is low and the impact resistance is easy to reveal.

The polyfunctional monomer is a component used as a crosslinking agent. Representative examples thereof are, for instance, an aromatic polyfunctional vinyl compound such as divinyl benzene, a dimethacrylic acid ester of a polyhydric alcohol such as polyethylene glycol dimethacrylate or 1,3-butanediol dimethacrylate, an allyl ester of an unsaturated carboxylic acid such as allyl methacrylate or allyl acrylate, a diallyl or triallyl compound such as diallyl phthalate or triallyl cyanurate, and the like. Of these polyfunctional monomers, there are preferred monomers whose at least one functional group has a different reactivity from that of the remaining functional group or groups, since crosslinked elastomeric polymers can be obtained by the use of a small amount of a polyfunctional monomer. Preferable examples of the polyfunctional monomer are, for instance, allyl methacrylate and diallyl phthalate.

The above-mentioned copolymerizable monomers include other copolymerizable monomers having a single vinyl group, conjugated diolefin compounds, organosiloxanes, and the like.

Examples of the other copolymerizable monomers having a single vinyl group are, for instance, alkyl acrylates other than those having a $C_2$ to $C_8$ alkyl group, other acrylic esters, methacrylic esters, acrylic acid, metal salts of acrylic acid, acrylamide, aromatic vinyl compounds and their derivatives, acrylonitrile, methacrylonitrile, vinyl ether compounds, vinyl ester compounds, vinyl halides, vinylidene halides, and the like.

Examples of the conjugated diolefin compounds are, for instance, 1,3-butadiene, isoprene, and the like.

Examples of the organosiloxanes are, for instance, a cyclic siloxane such as hexamethylcyclotrisiloxane, octamethylcyclotetrasiloxane, dodecamethylcyclotetrasiloxane or dodecamethylcyclohexasiloxane, an alkoxysilane such as trimethoxysilane or tetraethoxysilane, a methacryloyloxysiloxane such as β-methacryloyloxyethyldimethoxysilane or γ-methacryloyloxypropylmethoxydimethylsilane, and the like.

The process of the preparation of the crosslinked elastomeric polymer is not particularly limited. For example, it can be prepared by a usual emulsion polymerization method.

The graft copolymer (b) used in the present invention is obtained by graft-polymerizing 25 to 75 parts by weight, preferably 35 to 70 parts by weight, of a graft monomer component composed of 40 to 100% by weight, preferably 60 to 100% by weight, of methyl methacrylate and 0 to 60% by weight, preferably 0 to 40% by weight, of at least one monomer (hereinafter also referred to as "monomer component copolymerized with methyl methacrylate") selected from the group consisting of an alkyl acrylate having a $C_1$ to $C_8$ alkyl group, an alkyl methacrylate having a $C_2$ to $C_6$ alkyl group, an unsaturated nitrile and an aromatic vinyl compound onto 25 to 75 parts by weight, preferably 30 to 65 parts by weight, of the above-mentioned crosslinked elastomeric polymer so that the total thereof is 100 parts by weight. If the amount of the crosslinked elastomeric polymer is less than 25 parts by weight or more than 75 parts by weight, the impact resistance-improving effect is inferior if a vinyl chloride resin composition is prepared and molded to provide molded articles. Also, if the proportion of methyl methacrylate in the graft monomer component is less than 40% by weight, in other words, if the proportion of the monomer component copolymerized with methyl methacrylate is more than 60% by weight, the impact resistance-improving effect is lowered.

The graft monomer component is required to carefully select in order to raise the impact resistance-improving effect higher. It is important in imparting a sufficient impact resistance that the graft monomer component is compatible with the vinyl chloride resin (a). In the present invention, it is essential to use methyl methacrylate as a representative component compatible with the vinyl chloride resin (a).

Examples of the above-mentioned alkyl acrylate having a $C_1$ to $C_8$ alkyl group are, for instance, methyl acrylate, ethyl acrylate, n-butyl acrylate, 2-ethylhexyl acrylate, and the like.

Examples of the above-mentioned alkyl methacrylate having a $C_2$ to $C_6$ alkyl group are, for instance, ethyl methacrylate, n-butyl methacrylate, and the like.

Examples of the above-mentioned unsaturated nitrile are, for instance, acrylonitrile, methacrylonitrile, and the like.

Examples of the above-mentioned aromatic vinyl compound are, for instance, styrene, vinyl toluene, α-methylstyrene, and the like.

Of these, as the monomer component copolymerized with methyl methacrylate is particularly preferred a monomer component selected from methyl acrylate, ethyl acrylate, n-butyl acrylate, ethyl methacrylate, n-butyl methacrylate, acrylonitrile and styrene, since the effect of exhibiting the impact strength is raised without impairing an excellent compatibility of methyl methacrylate.

Upon carrying out the graft polymerization, for example, the graft monomer component may be added all at once, or a part or all thereof may be continuously or intermittently added. Also, in order to raise the degree of polymerization, a part or all of the graft monomer component may be added in one lot and polymerized in the presence of a small amount of a catalyst. Further, the graft monomer component may be subjected to the polymerization in such a manner that all monomers are mixed and polymerized, or in such a manner that the polymerization is carried out in two or more stages and the compositions of monomers in the respective stages are adjusted to be different from each other within the range of the above-mentioned composition for the graft monomer component.

The thus obtained graft copolymer latex is spray-dried, or is coagulated by salting out or with an acid followed by filtration, washing and drying. At the time of the coagulation, a conventional antioxidant or ultraviolet absorber may be added.

The graft copolymer (b) used in the present invention may also be prepared by mixing, in the state of latex, a latex obtained by polymerizing a part of the graft monomer component in the presence of the crosslinked elastomeric polymer with a latex obtained by emulsion-polymerizing the rest of the graft monomer component in a system free of the crosslinked elastomeric polymer, and coagulating the mixture followed by dehydration and drying. In this case, it is preferable from the viewpoint of impact resistance that the proportions of the graft monomer portion included in the former latex and the latter latex are from 40 to 99% by weight for the former and from 1 to 60% by weight for the latter.

Further, the graft copolymer (b) used in the present invention may be prepared by mixing, in the state of powder, a powder obtained by polymerizing a part of the graft monomer component in the presence of the crosslinked elastomeric polymer, followed by coagulation, dehydration and drying, with a powder obtained by emulsion-polymerizing the rest of the graft monomer component in a system free of the crosslinked elastomeric polymer followed by coagulation, dehydration and drying. In this case, it is preferable for the same reason as above that the proportions of the graft monomer portion included in the former powder and the latter powder are from 40 to 99% by weight for the former and from 1 to 60% by weight for the latter.

The degree of polymerization of the graft portion of the graft copolymer (b) is evaluated by $\eta sp/c$ obtained by measuring at 30° C. with respect to a 0.2 g/100 cc acetone solution of a component extracted from the graft copolymer (b) with methyl ethyl ketone. The value of $\eta sp/c$ is from 1 to 5, preferably from 1.5 to 4. If the $\eta sp/c$ value is less than 1, the impact resistance-improving effect is inferior when a vinyl chloride resin composition is prepared and molded to provide molded articles. Also, if the $\eta sp/c$ value is more than 5, there arise problems in processing that when a vinyl chloride resin composition is prepared and extruded, the thickness of molded articles fluctuates markedly or melt fracture appears on the surface of molded articles.

As mentioned above, the graft copolymer (b) is made from the crosslinked elastomeric polymer composed of an alkyl acrylate as a main component and the graft monomer component containing methyl methacrylate as a main component, and the proportion of the crosslinked elastomeric polymer therein is 25 to 75 parts by weight. Further, the graft copolymer (b) is adjusted so that the $\eta sp/c$ obtained by measuring at 30° C. with respect to a 0.2 g/100 cc acetone solution of a component extracted from the graft copolymer (b) with methyl ethyl ketone is from 1 to 5.

The obtained graft copolymer (b) is mixed with vinyl chloride resin (a) to give the composition according to the present invention.

The graft copolymer (b) is used in an amount of 1 to 10 parts by weight, preferably 2 to 9 parts by weight, per 100 parts by weight of the vinyl chloride resin (a). If the amount of the graft copolymer (b) is less than 1 part by weight, the effect produced by the use of the graft copolymer (b) is not sufficient. The use in an amount of more than 10 parts by weight is not economical, though the impact resistance is satisfied.

The vinyl chloride resin (a) includes copolymers containing at least 70% by weight of vinyl chloride as well as a homopolymer of vinyl chloride. Examples of monomers to be copolymerized with vinyl chloride which constitute the remaining 30% by weight or less are vinyl acetate, vinyl propionate, vinyl butylate, vinyl benzoate, acrylic acid, methacrylic acid, methyl acrylate, ethyl acrylate, methyl methacrylate, ethyl methacrylate, methacrylamide, and other copolymerizable monoolefinic monomers. These may be used alone or in combination of two or more.

As calcium carbonate (c) are used ground calcium carbonate, precipitated calcium carbonate, colloidal calcium carbonate and the like. The calcium carbonate (c) may be treated with a surface treating agent in order to improve the wettability with and dispersibility into the vinyl chloride resin (a). Examples of the treating agent are a fatty acid such as strearic acid, oleic acid or linolenic acid, an organic acid such as resin acid or silicic acid, an organotitanate such as isopropyltriisostearoyl titanate, a silane or phosphorus coupling agent such as γ-chloropropyltrimethoxysilane or monooctyl phosphate. The average particle size is preferably from 0.5 to 5 μm.

The amount of calcium carbonate (c) is from 10 to 30 parts by weight, preferably from 15 to 25 parts by weight, per 100 parts by weight of vinyl chloride resin (a). if the amount is less than 10 parts by weight, the Izod impact strength and the flexural modulus are not sufficiently improved. If the amount is more than 30 parts by weight, the Gardner strength is remarkably lowered, so molded articles are not suitable for practical use.

The vinyl chloride resin composition of the present invention can be prepared by blending the above-mentioned raw materials in the same manner as the preparation of conventional vinyl chloride resin compositions, and the method of the preparation is not particularly limited. Upon blending the raw materials, general additives conventionally used in vinyl chloride resin compositions such as stabilizer may be incorporated.

The method for molding the composition is also not particularly limited. The composition of the present invention may be molded alone, or may be molded together with other resins to give multilayer-structured molded articles. For example, multilayer-structured molded articles having a layer made of the vinyl chloride resin composition of the present invention can be easily obtained by simultaneous forming of sheets or profiles made of the composition and other resin to combine each other by a method generally called coextrusion. The composition of the present invention can be used in the surface layer and/or inner layer of the multilayer-structured molded articles, and is usually used in the inner layer.

The molded articles having a layer made of the vinyl chloride resin composition of the present invention are applicable, for example, to uses such as siding sheet for housing, eaves trough, storm shutter and window frame. The thickness of the layer made of the vinyl chloride resin composition of the present invention cannot be generically specified because of varying depend on the uses, but for example is from about 0.5 to about 2.5 mm.

The present invention is more specifically explained by means of Examples, wherein all parts are by weight unless otherwise noted. It is to be understood that the Examples are for purpose of illustration only and the present invention is not limited thereto.

EXAMPLE 1

(A) Preparation of Crosslinked Elastomeric Polymer

A glass reactor equipped with a thermometer, a stirrer, a reflux condenser, an inlet device for introducing nitrogen gas, a device for introducing monomers was charged with 250 parts of distilled water, 0.5 part of potassium stearate, 0.2 part of sodium formaldehyde sulfoxylate, 0.01 part of disodium ethylenediaminetetraacetate and 0.005 part of ferrous sulfate heptahydrate. The temperature was then raised to 50° C. in a nitrogen stream with stirring, and a monomer mixture composed of 100 parts of n-butyl acrylate (BA), 1 part of allyl methacrylate and 0.1 part of cumene hydroperoxide was added dropwise to the system over 4 hours. Also, together with the addition of the monomer mixture, a 5% by weight aqueous solution of 2 parts of potassium stearate was continuously added over 4 hours. After the completion of the addition, the mixture was stirred for 1.5 hours to complete the polymerization. The polymerization conversion was 97% by weight, and the obtained latex had an average particle size of 700 Å.

(B) Preparation of Graft Copolymer (b)

A glass reactor was charged with 45 parts (solid basis) of the latex of a crosslinked elastomeric polymer obtained in (A), 0.05 part of sodium formaldehyde sulfoxylate, 0.01 part of disodium ethylenediaminetetraacetate and 0.005 part of ferrous sulfate heptahydrate. The aqueous dispersion was stirred at 50° C. in a nitrogen stream.

Then, a graft monomer component composed of 35 parts of methyl methacrylate (MMA) and 20 parts of butyl methacrylate (BMA) and 0.01 part of cumene hydroperoxide were continuously added over 1 hour (the components added at this time being hereinafter also referred to as "components added for grafting").

After the completion of the addition, 0.01 part of cumene hydroperoxide was added, and the stirring was further continued for 2 hours to complete the polymerization. The polymerization conversion was 99.8% by weight. The obtained graft copolymer latex was subjected to salting out, dehydration and drying to give the objective graft copolymer.

The viscosity of a component extracted from the graft copolymer was measured by the following method.

(Viscosity)

A graft copolymer was immersed in methyl ethyl ketone for 24 hours, and the soluble portion was separated by centrifugation. The soluble portion was purified by reprecipitation from methanol and dried. The thus obtained extracted component was dissolved in acetone to give a 0.2 g/1100 cc acetone solution, and the ηsp/c thereof was measured at 30° C.

Next, 5 parts of a powder of the obtained graft copolymer was blended with 100 parts of a vinyl chloride resin (KANEVINYL S 1001, average degree of polymerization 1,000), 1.5 parts of dioctyl tin stabilizer, 1.4 parts of calcium stearate, 1 part of paraffin wax, 1 part of titanium oxide and 20 parts of calcium carbonate. The obtained composition was molded into a sheet having a thickness of 1 mm under the following molding conditions.

(Molding Conditions)

Molding machine: CMT-45 made by Cincinnati Milacron Inc.

Molding temperatures (° C.): C1/C2/C3/AD/D1/D2 180/170/165/190/195/185

Revolutions of screw: 30 r.p.m.

Output: 75 kg/hour

By using the obtained sheet, the Gardner impact strength, Izod impact strength, flexural modulus and surface appearance were evaluated by the following methods.

Gardner Impact Strength:

The Gardner impact strength was measured at 23° C. according to ASTM D4226-93.

Izod Impact Strength:

The sheets were stacked up and heat-pressed (at 200° C. for 15 minutes) to give test specimens having a length of 70 mm, a width of 15 mm and a thickness of 3 mm, and the Izod impact strength was measured at 23° C.

Flexural Modulus:

The sheets were stacked up and heat-pressed (at 200° C. for 15 minutes) to give test specimens having a length of 130 mm, a width of 15 mm and a thickness of 3 mm, and the flexural modulus was measured at a testing speed of 1 mm/minute.

Surface Appearance:

Melt fracture was visually observed and evaluated according to the following criteria.

A: No melt fracture appears.

B: Melt fracture appears at a part of the sheet.

C: Melt fracture appears at half or more part of the sheet.

The results of the specific viscosity, Gardner impact strength, Izod impact strength, flexural modulus and surface appearance are shown in Table 1.

EXAMPLE 2

A graft copolymer was prepared and evaluated in the same manner as in Example 1 except that cumene hydroperoxide of the components added for grafting was used in an amount of 0.003 part. The results are shown in Table 1.

EXAMPLE 3

A graft copolymer was prepared and evaluated in the same manner as in Example 1 except that only the graft monomer component was added all at once and thereafter 0.003 part of cumene hydroperoxide was added, and the reaction was conducted for 1 hour. The results are shown in Table 1.

EXAMPLE 4

A graft copolymer was prepared and evaluated in the same manner as in Example 1 except that the crosslinked elastomeric polymer was used in an amount of 30 parts and a graft monomer component composed of 45 parts of methyl methacrylate and 25 parts of butyl methacrylate was used. The results are shown in Table 1.

EXAMPLE 5

A graft copolymer was prepared and evaluated in the same manner as in Example 2 except that the crosslinked elastomeric polymer was used in an amount of 60 parts and a graft monomer component composed of 25 parts of methyl methacrylate and 15 parts of butyl methacrylate was used. The results are shown in Table 1.

EXAMPLE 6

A graft copolymer was prepared and evaluated in the same manner as in Example 1 except that the crosslinked elastomeric polymer was used in an amount of 45 parts and a graft monomer component composed of 40 parts of methyl methacrylate, 10 parts of butyl methacrylate and 5 parts of butyl acrylate ((BA) was used. The results are shown in Table 1.

EXAMPLE 7

A graft copolymer was prepared and evaluated in the same manner as in Example 3 except that the crosslinked elastomeric polymer was used in an amount of 45 parts and a graft monomer component composed of 40 parts of methyl methacrylate, 10 parts of butyl methacrylate and 5 parts of butyl acrylate ((BA) was used. The results are shown in Table 1.

COMPARATIVE EXAMPLE 1

A graft copolymer was prepared and evaluated in the same manner as in Example 1 except that cumene hydroperoxide of the components added for grafting was used in an amount of 0.05 part. The results are shown in Table 1.

COMPARATIVE EXAMPLE 2

A graft copolymer was prepared and evaluated in the same manner as in Example 3 except that cumene hydroperoxide added after the addition of the graft monomer component was used in an amount of 0.001 part. The results are shown in Table 1.

COMPARATIVE EXAMPLE 3

A graft copolymer was prepared and evaluated in the same manner as in Example 2 except that the crosslinked elastomeric polymer was used in an amount of 15 parts and a graft monomer component composed of 54 parts of methyl methacrylate and 31 parts of butyl methacrylate was used. The results are shown in Table 1.

COMPARATIVE EXAMPLE 4

A graft copolymer was prepared and evaluated in the same manner as in Example 2 except that the crosslinked elastomeric polymer was used in an amount of 80 parts and a graft monomer component composed of 13 parts of methyl methacrylate and 7 parts of butyl methacrylate was used. The results are shown in Table 1.

COMPARATIVE EXAMPLE 5

A graft copolymer was prepared and evaluated in the same manner as in Example 7 except that cumene hydroperoxide of the components added for grafting was used in an amount of 0.05 part. The results are shown in Table 1.

COMPARATIVE EXAMPLE 6

A graft copolymer was prepared and evaluated in the same manner as in Example 7 except that cumene hydroperoxide added after the addition of the graft monomer component was used in an amount of 0.001 part. The results are shown in Table 1.

COMPARATIVE EXAMPLE 7

The evaluation was conducted in the same manner as in Example 1 except that calcium carbonate was used in an amount of 5 parts. The results are shown in Table 1.

COMPARATIVE EXAMPLE 8

The evaluation was conducted in the same manner as in Example 1 except that calcium carbonate was used in an amount of 35 parts. The results are shown in Table 1.

TABLE 1

| | Composition of cross-linked elastomeric polymer (part) | Composition of graft monomer component (part) | ηsp/c | Amount of calcium carbonate (part) | Gardner impact strength (in · lbs/mil) | Izod impact strength (kg · cm/cm) | Flexural modulus ($10^3$ MPa) | Surface appearance |
|---|---|---|---|---|---|---|---|---|
| Ex. 1 | BA(45) | MMA(35), BMA(20) | 1.8 | 20 | 2.6 | 95.6 | 3.12 | A |
| Ex. 2 | BA(45) | MMA(35), BMA(20) | 2.8 | 20 | 2.6 | 93.4 | 3.12 | A |
| Ex. 3 | BA(45) | MMA(35), BMA(20) | 4.2 | 20 | 2.8 | 96.8 | 3.17 | A–B |
| Ex. 4 | BA(30) | MMA(45), BMA(25) | 2.2 | 20 | 2.7 | 80.5 | 3.22 | A |
| Ex. 5 | BA(60) | MMA(25), BA(15) | 2.6 | 20 | 2.3 | 110.7 | 3.10 | A |
| Ex. 6 | BA(45) | MMA(40), BMA(10), BA(5) | 2.3 | 20 | 2.8 | 96.8 | 3.20 | A |
| Ex. 7 | BA(45) | MMA(40), BMA(10), BA(5) | 4.3 | 20 | 2.6 | 93.6 | 3.19 | A–B |
| Com. Ex. 1 | BA(45) | MMA(35), BMA(20) | 0.8 | 20 | 1.8 | 95.8 | 3.08 | A |
| Com. Ex. 2 | BA(45) | MMA(35), BMA(20) | 5.5 | 20 | 2.5 | 97.7 | 3.11 | C |
| Com. Ex. 3 | BA(15) | MMA(54), BMA(31) | 2.9 | 20 | 1.4 | 67.8 | 3.18 | A |
| Com. Ex. 4 | BA(80) | MMA(13), BMA(7) | 1.9 | 20 | 1.4 | 103.4 | 3.02 | A |
| Com. Ex. 5 | BA(45) | MMA(40), BMA(10), BA(5) | 0.7 | 20 | 1.7 | 89.9 | 3.07 | A |
| Com. Ex. 6 | BA(45) | MMA(40), BMA(10), BA(5) | 5.6 | 20 | 2.5 | 96.6 | 3.15 | C |
| Com. Ex. 7 | BA(45) | MMA(35), BMA(20) | 1.8 | 5 | 3.0 | 20.4 | 2.62 | A |
| Com. Ex. 8 | BA(45) | MMA(35), BMA(20) | 1.8 | 35 | 1.3 | 88.8 | 3.44 | A |

EXAMPLE 8

(A) Preparation of Crosslinked Elastomeric Polymer

A glass reactor equipped with a thermometer, a stirrer, a reflux condenser, an inlet device for introducing nitrogen gas, a device for introducing monomers was charged with 250 parts of distilled water, 0.3 part of potassium stearate, 0.2 part of sodium formaldehyde sulfoxylate, 0.01 part of disodium ethylenediaminetetraacetate and 0.005 part of ferrous sulfate heptahydrate. The temperature was then raised to 50° C. in a nitrogen stream with stirring, and a monomer mixture composed of 100 parts of n-butyl acrylate, 1 part of allyl methacrylate and 0.1 part of cumene hydroperoxide was added dropwise to the system over 4 hours. Also, together with the addition of the monomer mixture, a 5% by weight aqueous solution of 2 parts of potassium stearate was continuously w added over 4 hours. After the completion of the addition, the mixture was stirred for 1.5 hours to complete the polymerization. The polymerization conversion was 97% by weight, and the obtained latex had an average particle size of 850 Å.

(B) Preparation of Graft Copolymer (b)

A glass reactor was charged with 45 parts (solid basis) of the latex of a crosslinked elastomeric polymer obtained in (A), 0.05 part of sodium formaldehyde sulfoxylate, 0.01 part of disodium ethylenediaminetetraacetate and 0.005 part of ferrous sulfate heptahydrate. The aqueous dispersion was stirred at 50° C. in a nitrogen stream.

Then, a graft monomer component composed of 17.5 parts of methyl methacrylate and 10 parts of butyl methacrylate and 0.0015 part of cumene hydroperoxide were continuously added over 1 hour (the components added at this time being hereinafter also referred to as "components added for grafting").

After the completion of the addition, 0.01 part of cumene hydroperoxide was added, and the stirring was further continued for 2 hours to complete the polymerization. The polymerization conversion was 99.8% by weight.

(C) Preparation of a Copolymer

A glass reactor was charged with 200 parts of distilled water, 0.4 part of potassium stearate, 0.01 part of sodium formaldehyde sulfoxylate, 0.005 part of disodium ethylenediaminetetraacetate and 0.0025 part of ferrous sulfate heptahydrate. The aqueous dispersion was stirred at 60° C. in a nitrogen stream.

Then, a monomer component composed of 17.5 parts of methyl methacrylate and 10 parts of butyl methacrylate and 0.0015 part of cumene hydroperoxide were continuously added over 1 hour (the components added at this time being hereinafter also referred to as "components added for polymerization").

After the completion of the addition, 0.01 part of cumene hydroperoxide was added, and the stirring was further continued for 2 hours to complete the polymerization. The polymerization conversion was 99.6% by weight.

The graft copolymer latex obtained in (B) and the copolymer latex obtained in (C) were mixed, salted out, dehydrated and dried to give an objective graft copolymer. The graft copolymer was evaluated in the same manner as in Example 1. The results are shown in Table 2.

EXAMPLE 9

The procedure of Example 8 was repeated except that the graft copolymer latex obtained in (B) and the copolymer latex obtained in (C) were separately salted out, dehydrated and dried to give respective powdery resins, and they were mixed in the state of powder and subjected to the evaluation. The results are shown in Table 2.

EXAMPLE 10

The procedure of Example 8 was repeated except that the graft copolymer latex was prepared from 45 parts of the crosslinked elastomeric polymer and a graft monomer component composed of 20 parts of methyl methacrylate, 5 parts of butyl methacrylate and 2.5 parts of butyl acrylate, and in (C) the copolymer latex was prepared from 20 parts of methyl methacrylate, 5 parts of butyl methacrylate and 2.5 parts of butyl acrylate. The results are shown in Table 2.

EXAMPLE 11

The procedure of Example 10 was repeated except that the graft copolymer latex and the copolymer latex were separately salted out, dehydrated and dried to give respective powdery resins, and they were mixed in the state of powder and subjected to the evaluation. The results are shown in Table 2.

COMPARATIVE EXAMPLE 9

The procedure of Example 9 was repeated except that in the preparation of the graft copolymer latex, cumene hydroperoxide of the components added for grafting was used in an amount of 0.05 part, and in the preparation of the copolymer latex, cumene hydroperoxide of the components added for polymerization was used in an amount of 0.05 part. The results are shown in Table 1.

COMPARATIVE EXAMPLE 10

The procedure of Example 9 was repeated except that in the preparation of the graft copolymer latex, cumene hydroperoxide of the components added for grafting was used in an amount of 0.0005 part, and in the preparation of the copolymer latex, cumene hydroperoxide of the components added for polymerization was used in an amount of 0.0005 part. The results are shown in Table 1.

TABLE 2

| | Composition of crosslinked elastomeric polymer (part) | Composition of graft monomer component used in polymerization in the present of crosslinked elastomeric polymer (part) | Composition of monomer component used in polymerization in the absence of crosslinked elastomeric polymer (part) | Mixing manner of component (b) | $\eta sp/c$ | Gardner impact strength (in · lbs/mil) | Izod impact strength (kg · cm/cm) | Flexural modulus ($10^3$ MPa) | Surface appearance |
|---|---|---|---|---|---|---|---|---|---|
| Ex. 8 | BA(45) | MMA(17.5) BMA(10) | MMA(17.5) BMA(10) | mixing in latex state | 2.8 | 2.8 | 80.3 | 3.17 | A |
| Ex. 9 | BA(45) | MMA(17.5) BMA(10) | MMA(17.5) BMA(10) | mixing in powder state | 2.8 | 2.7 | 78.8 | 3.15 | A |
| Ex. 10 | BA(45) | MMA(20) BMA(5) BA(2.5) | MMA(20) BMA(5) BA(2.5) | mixing in latex state | 2.3 | 2.6 | 88.7 | 3.22 | A |

TABLE 2-continued

| | Composition of crosslinked elastomeric polymer (part) | Composition of graft monomer component used in polymerization in the present of crosslinked elastomeric polymer (part) | Composition of monomer component used in polymerization in the absence of crosslinked elastomeric polymer (part) | Mixing manner of component (b) | ηsp/c | Gardner impact strength (in · lbs/mil) | Izod impact strength (kg · cm/cm) | Flexural modulus (10³ MPa) | Surface appearance |
|---|---|---|---|---|---|---|---|---|---|
| Ex. 11 | BA(45) | MMA(20) BMA(5) BA(2.5) | MMA(20) BMA(5) BA(2.5) | mixing in powder state | 2.3 | 2.7 | 89.3 | 3.23 | A |
| Com. Ex. 9 | BA(45) | MMA(17.5) BMA(10) | MMA(17.5) BMA(10) | mixing in latex state | 0.8 | 1.6 | 80.2 | 3.12 | A |
| Com. Ex. 10 | BA(45) | MMA(17.5) BMA(10) | MMA(17.5) BMA(10) | mixing in latex state | 5.3 | 2.5 | 82.5 | 3.16 | C |

Industrial Applicability

According to the present invention, excellent weatherability and impact resistance can be exhibited by incorporating a vinyl chloride resin with, per 100 parts by weight of the vinyl chloride resin, 1 to 10 parts by weight of a graft copolymer wherein 25 to 75 parts by weight of a graft monomer component is polymerized onto 25 to 75 parts by weight of a crosslinked elastomeric polymer and the ηsp/c value of a component extracted with methyl ethyl ketone from the graft copolymer is from 1 to 5 when measured at 30° C. with respect to its 0.2 g/100 cc acetone solution, and 10 to 30 parts of calcium carbonate.

What is claimed is:

1. A vinyl chloride resin composition having excellent weatherability and impact resistance which comprises:

(a) 100 parts by weight of a vinyl chloride resin, (b) 1–10 parts by weight of a graft copolymer which is obtained by polymerizing 25 to 75 parts by weight of a graft monomer component to 25 to 75 parts by weight of a crosslinked elastomeric polymer so that the total thereof is 100 parts by weight, and the methyl ethyl ketone-soluble portion of which has a reduced viscosity $n_{sp}/c$, wherein $n_{sp}$ is specific viscosity and c is concentration of polymer in solvent in g/100 mL, of 1 to 5 measured at 30° C. with respect to its 0.2 g/100 cc acetone solution, said graft monomer component being composed of 40 to 100% by weight of methyl methacrylate and 0 to 60% by weight of at least one monomer selected from the group consisting of an alkyl acrylate having a $C_1$ to $C_8$ alkyl group, an alkyl methacrylate having a $C_2$ to $C_6$ alkyl group, an unsaturated nitrile and an aromatic vinyl compound, and said crosslinked elastomeric polymer being composed of 79.9 to 99.99% by weight of an alkyl acrylate having a $C_2$ to $C_8$ alkyl group, 0.01 to 5% by weight of a polyfunctional monomer and 0 to 20% by weight of other monomers copolymerizable therewith, said polyfunctional monomer being selected from the group consisting of an aromatic polyfunctional vinyl compound, a dimethacrylic acid ester of a polyhydric alcohol, an allyl ester of an unsaturated carboxylic acid, a diallyl compound and a triallyl compound, and said other monomers being selected from the group consisting of monomers having a single vinyl group, and (c) 10 to 30 parts by weight of calcium carbonate.

2. A molded article having a layer molded from the composition of claim 1.

3. The composition of claim 1, wherein said methyl ethyl ketone-soluble portion has a reduced viscosity $n_{sp}/c$ of 1.5 to 4.

4. The composition of claim 1, wherein said other monomers in said crosslinked elastomeric polymer are a member selected from the group consisting of alkyl acrylates other than those having a $C_2$ to $C_8$ alkyl group, methacrylic esters, acrylic acid, metal salts of acrylic acid, acrylamide, aromatic vinyl compounds and their derivatives, acrylonitrile, methacrylonitrile, vinyl ether compounds, vinyl ester compounds, vinyl halides, vinylidene halides and methacryloyloxysiloxanes.

5. The composition of claim 1, wherein said graft copolymer is composed of 35 to 70 parts by weight of a graft component and 30 to 65 parts by weight of a crosslinked elastomeric polymer, the total being 100 parts by weight.

6. The composition of claim 1, wherein said graft monomer component is composed of 60 to 100% by weight of methyl methacrylate and 0 to 40% by weight of at least one monomer selected from the group consisting of an alkyl acrylate having a $C_1$ to $C_8$ group, an alkyl methacrylate having a $C_2$ to $C_6$ alkyl group, an unsaturated nitrile and an aromatic vinyl compound.

7. The composition of claim 1, wherein the amount of said calcium carbonate is from 15 to 25 parts by weight based on 100 parts by weight of said vinyl chloride resin.

* * * * *